United States Patent [19]

Woodruff et al.

[11] 4,383,647
[45] May 17, 1983

[54] INTEGRATED HYDRAULIC CONTROL CIRCUIT FOR JET ENGINE THRUST REVERSER AND VARIABLE EXHAUST NOZZLE

[75] Inventors: Frank Woodruff, New Hartford; John H. Ferguson, Jr., Sauquoit; John R. Hoffman, New Hartford, all of N.Y.

[73] Assignee: The Bendix Corporation, Teterboro, N.J.

[21] Appl. No.: 180,273

[22] Filed: Aug. 22, 1980

[51] Int. Cl.³ .............................................. F02K 1/15
[52] U.S. Cl. ................................ 239/265.19; 60/430; 60/465; 244/110 B
[58] Field of Search ...................... 239/265.11, 265.19, 239/265.25, 265.27, 265.29, 265.31; 244/110 B, 113; 60/226 A, 229, 230, 223, 428, 429, 430, 465

[56] References Cited

U.S. PATENT DOCUMENTS

| | | | |
|---|---|---|---|
| 3,015,936 | 1/1962 | Brewer et al. | 239/265.19 |
| 3,263,623 | 8/1966 | Alexanderson et al. | 92/57 |
| 3,367,109 | 2/1968 | Troeger et al. | 60/388 |
| 3,456,881 | 7/1969 | Beitler et al. | 60/430 |
| 3,604,662 | 9/1971 | Nelson, Jr. et al. | 244/110 B |
| 4,210,066 | 7/1980 | Aldrich | 60/230 |
| 4,212,442 | 7/1980 | Fage | 244/110 B |

FOREIGN PATENT DOCUMENTS

| | | | |
|---|---|---|---|
| 648842 | 11/1962 | Italy | 244/110 B |
| 182858 | 3/1963 | Sweden | 244/110 B |

Primary Examiner—John J. Love
Assistant Examiner—Michael J. Forman
Attorney, Agent, or Firm—Anthony F. Cuoco; James R. Ignatowski

[57] ABSTRACT

The invention is an integrated hydraulic control circuit for actuating the thrust reversers and variable exhaust nozzle on high performance gas turbine engine powered aircraft. The hydraulic circuits for both systems are integrated into a single housing and are served by common elements. The circuit for the deployment and stowage of the thrust reverser buckets is hydraulically sequenced inhibiting the application of hydraulic power to the actuators prior to withdrawal of the locking pin. In a like manner, the thrust reversers must be fully retracted before the locking pin is deployed. The hydraulic circuit for the thrust reversers also includes a pressure compensating circuit which reduces the pressure applied to thrust reverser actuators with the thrust reversers in the stowed position.

29 Claims, 6 Drawing Figures

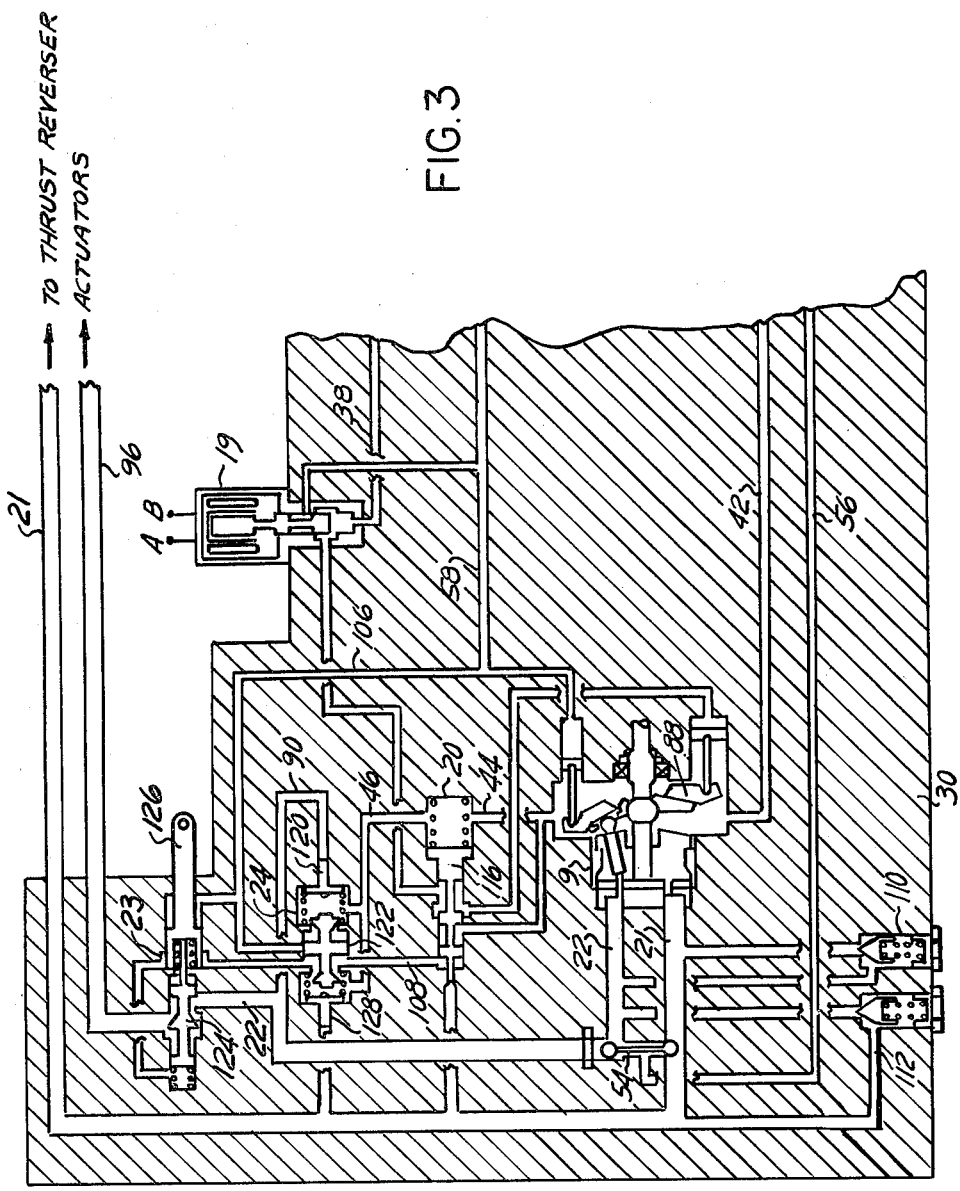

INTEGRATED HYDRAULIC CONTROL CIRCUIT FOR JET ENGINE THRUST REVERSER AND VARIABLE EXHAUST NOZZLE

BACKGROUND OF THE INVENTION

1. Field of the Invention

The invention is related to hydraulic control circuits for a gas turbine or jet engine, and in particular are related to hydraulic circuits controlling the thrust reversers and variable exhaust nozzles of these engines.

2. Prior Art

Many gas turbine or jet engines used on high performance aircraft include a thrust reverser (T.R.) mechanism which reverses the direction of the exhaust gases being expelled by the engine and a variable exhaust nozzle which optimizes the forward thrust of the engine under various conditions. The two mechanisms have different functions and present day gas turbine engines have separate control systems for each. The use of separate control systems adds additional weight and complexity to the aircraft which detracts from its overall performance. The disclosed invention is an integrated thrust reverser and exhaust nozzle hydraulic control circuit which eliminates the duplication of common element contained in the dual control systems of the prior art yet is capable of independently performing the desired individual functions.

SUMMARY OF THE INVENTION

The invention is an integrated hydraulic circuit for controlling the actuation of the thrust reversers and variable exhaust nozzle on a high performance gas turbine powered aircraft. The circuit comprises a common boost pump, servo pump and filter system, a first multiple piston overcenter pump providing hydraulic power to a set of hydraulic actuators controlling the position of the variable exhaust nozzle and a second multiple position overcenter pump providing hydraulic power to a set of hydraulic actuators controlling the position of the thrust reversers. The four pumps are encased in a common housing and driven by a common rotating shaft. The position of the variable exhaust nozzle actuators is controlled by a first electro-hydraulic servo valve which generates hydraulic signals controlling the position of the tilt block in the first multiple piston overcenter pump. Three feedback loops, one hydraulic, one mechanical, and one electrical control the output generated by the first electro-hydraulic servo valve. The position of the thrust reversers is controlled by a second electro-hydraulic servo valve which generates hydrualic signals controlling the position of the tilt block in the second multiple piston overcenter pump. The thrust reverser circuit includes a pressure compensating valve, a lock pin actuator, and a sequencing valve. The pressure compensator valve reduces the output pressure of the second multiple piston overcenter pump when the thrust reversers are in the stowed position. The sequencing valve controls the operation of the pressure compensating valve and the operating sequence of the lock pin actuator such that hydraulic power to the thrust reverser actuators is inhibited until the lock pin is fully extracted.

The object of the disclosed system is an integrated thrust reverser and variable exhaust nozzle control circuit contained in a common housing.

Another object of the invention is to eliminate the duplication of elements common to both the thrust reverser and variable exhaust nozzle controls reducing both cost and weight.

Another object of the invention is hydraulic circuit in which unlocking and deployment of the thrust reversers and the stowing and locking of the thrust reversers are hydraulically performed in a sequential manner.

Still another object of the invention is to reduce the pressure applied to the thrust reverser actuators in the stowed position to reduce the energy consumption and heat generated by the control system.

Further objects and advantages of the disclosed integrated control system will become apparent on consideration of the accompanying description and drawings.

BRIEF DESCRIPTION OF THE FIGURES

FIG. 3 is the hydraulic schematic of only the thrust reverser circuit of FIG. 2B showing the state of the elements in response to a demand to deploy the thrust reversers.

DETAILED DESCRIPTION OF THE INVENTION

Figure 1:
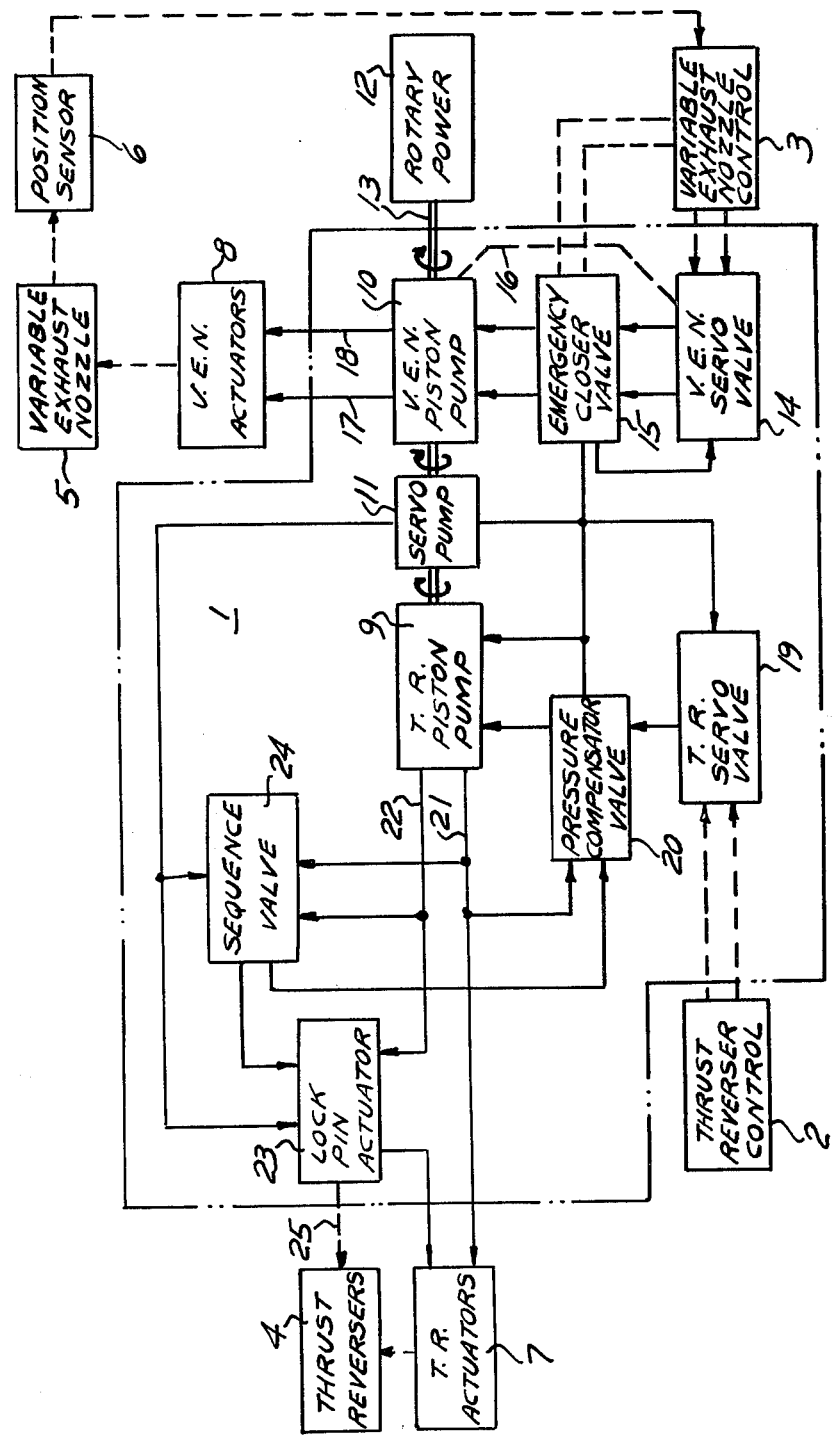
FIG. 1 is a block diagram of the thrust reverser and exhaust nozzle control system.

FIG. 1 is a block diagram of a thrust reverser and variable exhaust nozzle hydraulic control system for a gas turbine or "jet" engine incorporating the integrated control circuit. The block diagram shows the interrelationship between the various inputs, actuator outputs, and the disclosed electrohydraulic circuit. Referring to FIG. 1, the hydraulic connections are shown as solid lines, mechanical connections are shown as dashed lines, and electrical connections are shown as dotted lines. The hydraulic circuit 1 receives electrical inputs from a Thrust Reverser Control 2 and a Variable Exhaust Nozzle Control 3. The Thrust Reverser Control 2 generates an electrical signal indicative of whether the Thrust Reversers 4 are to be deployed or stowed in response to manual inputs. In a like manner, the Variable Exhaust Nozzle Control 3 generates an electrical signal indicative of the direction and rate at which the Variable Exhaust Nozzle 5 is to be moved in response to a manually commanded new position. The system also includes the generation of an electrical signal demanding the immediate closure of the exhaust nozzle in an emergency.

A Position Sensor 6 mechanically linked to the Variable Exhaust Nozzle 5 generates a feedback signal to the Variable Exhaust Nozzle Control 3 indicative of the actual position of the Variable Exhaust Nozzle 5. The Variable Exhaust Nozzle Control 3 compares the actual position signal with the commanded position and terminates the electrical input signal to the Electrohydraulic Circuit 1 when the actual position of the exhaust nozzle is the same as the commanded position. Closed loop electrical circuits of this type are well known in the art. Therefore, a detailed description of this circuit is not necessary for an understanding of the invention.

The position of the Variable Exhaust Nozzle 5 is controlled by hydraulic Variable Exhaust Nozzle (V.E.N.) Actuators 8 receiving hydraulic fluid from the Electrohydraulic Circuit 1.

The position of the Thrust Reversers 4 are controlled by hydraulic Thrust Reverser (T.R.) Actuators 7 receiving hydraulic fluid from the Electrohydraulic Circuit 1. A mechanical link 25 from the Electrohydraulic Circuit 1 activates a thrust reverse locking mechanism to lock the Thrust Reversers 4 in their stowed position.

The Electrohydraulic Circuit 1 comprises a Thrust Reverser (T.R.) Piston Pump 9, a Variable Exhaust Nozzle (V.E.N.) Piston Pump 10, and a Servo Pump Means 11, each mechanically connected to a common Rotary Power Source 12 by means of a common drive Shaft 13. The Servo Pump means 11 provides a control fluid at a servo pressure to the various control elements within the Hydraulic Circuit 1 as shown.

A variable exhaust nozzle or V.E.N. Servo Valve 14 modulates the control fluid received from the Servo Pump 11 in response to the electrical signals received from the Variable Exhaust Nozzle Control 3 and generates hydraulic V.E.N. pump control signals which control the output of the V.E.N. Piston Pump 10. These hydraulic V.E.N. pump control signals are transmitted to the V.E.N. Piston Pump 10 through an Emergency Closure Valve 15 which in its unactivated state passes unaltered the V.E.N. pump control signals generated by the V.E.N. Servo Valve 14. The Emergency Closure Valve 15 is activated in response to an electrical emergency exhaust nozzle closure signal commanding an immediate closure of the Exhaust Nozzle 5. As is known in the art, the electrical emergency exhaust nozzle closure signal generator may be part of the Exhaust Nozzle Control 3 as shown, or may be an independent control. The Emergency Closure Valve 15, in the activated state, terminates the hydraulic signals generated by the V.E.N. Servo Valve 14 and generates a hydraulic signal commanding the V.E.N. Piston Pump 10 to generate an output activating the V.E.N. Actuators 8 to immediately close the Exhaust Nozzle 5.

A mechanical feedback, indicated by dashed line 16, interconnects the V.E.N. Piston Pump 10 with the V.E.N. Servo Valve and maintains the output of the V.E.N. Piston Pump 10 proportional to the magnitude of the electrical signal being received by the V.E.N. Servo Valve 14.

The V.E.N. Piston Pump 10 has two fluid outputs 17 and 18 which are connected directly to the V.E.N. Actuators 8. A pressure differential between the two fluid outputs of the V.E.N. Piston Pump 10 is determinative of the direction and rate which the V.E.N. Actuators 8 move the Exhaust Nozzle 5.

A thrust reverser or (T.R.) Servo Valve 19 modulates the control fluid received from the Servo Pump 11 in response to the electrical signals received from the Thrust Reverser Control 2, and generates a hydraulic T.R. pump control signal which is transmitted to the T.R. Piston Pump 9 through a Pressure Compensating Valve 20. The Pressure Compensating Valve 20 reduces the pressure of the fluid output from the T.R. Piston Pump 9 when the Thrust Reversers are in the stowed position as shall be explained hereinafter.

The T.R. Piston Pump 9 alternatively produces fluid outputs on lines 21 and 22 in response to the hydraulic T.R. pump control signals. These fluid outputs are transmitted to the T.R. Actuators 7. The fluid output on line 21 which causes the Thrust Reverser Actuator 7 to stow the thrust reversers is transmitted directly to the Thrust Reverser Actuator 7, while the fluid output on line 22 which causes the Thrust Reverser Actuators 7 to deploy the thrust reversers is transmitted to the Thrust Reverser Actuators 7 through a Lock Pin Actuator 23.

A Sequencing Valve 24 modulates the control fluid received from the Servo Pump 11 in response to the fluid pressure on the output lines 21 and 22 and generates an output signal controlling the operation of the Lock Pin Actuator 23. When the pressure on line 22 exceeds a predetermined value, the output signal from the Sequencing Valve 24 activates the Lock Pin Actuator 23 to sequentially produce a mechanical output, indicated by dashed line 25, which unlatches the thrust reversers locking mechanism, then transmits the fluid flow in line 22 to the T.R. Actuators 7. A fluid flow on line 22 causes the T.R. Actuators 7 to deploy the thrust reversers. In the stowing procedure, the Sequencing Valve 24 responds to the pressure surge on line 21 which is generated when the T.R. Actuators 7 reach the end of their travel placing the thrust reversers in their stowed position, and terminates the signal generated by the Sequencing Valve. The Lock Pin Actuator 23 responds to the termination of this signal and sequentially blocks the fluid flow on line 22 and then produces a mechanical output latching the thrust reverser locking mechanism.

The Sequencing Valve 24 also produces an output signal which in cooperation with the fluid pressure on line 21 modulates the hydraulic signal generated by the T.R. Servo Valve 19. The modulated hydraulic signal output from the Pressure Compensating Valve 20 cause the T.R. Piston Pump 9 to reduce the pressure on line 21 when the Thrust Reversers 4 are locked in their stowed position. The reduced pressure reduces the energy required to hold the thrust reversers in their stowed position.

The variable exhaust nozzle or V.E.N. Servo Valve 14 is an electro-hydraulic servo valve such as Moog Model 33-214 A manufactured by Moog Inc. of East Aurora, N.Y. or Pegasus Model 015100 manufactured by Koehring, Pegsus Division of Troy, Mich. The V.E.N. Servo Valve 14 is modified to permit a mechanical feed back from the tilt block in Piston Pump 10 to cooperate with servo valves cantilever spring in controlling the position of the servo valves flapper as shall be explained hereinafter. This modification correspondends to the mechanical feedback between piston pump tilt block and the control valve illustrated and described by Troeger et al in U.S. Pat. No. 3,367,109. The thrust reverser or T.R. Servo Valve 19 and Emergency Closure Valve 15 are relatively standard two position solenoid actuated hydraulic valves which may be purchased commercially from a variety of sources.

OPERATION

The operation of the variable exhaust nozzle system is as follows:

The Position Sensor 6 continuously generates an electrical signal indicative of the position of the Variable Exhaust Nozzle 5. When a command is received to change the position of the exhaust nozzle, the Variable Exhaust Nozzle Control 3 compares the actual position with the new commanded position and generates an electrical signal having a polarity indicative of the direction in which the exhaust nozzle is to be moved and a magnitude indicative of the distance between the actual position and the commanded position. The V.E.N.

Servo Valve 14 modulates the control fluid in response to the electrical signals received from the Variable Exhaust Nozzle Control 3 and generates a hydraulic signal activating the V.E.N. Piston Pump 10 to output fluid on lines 17 or 18.

The fluid flow output on lines 17 or 18, which actuates V.E.N. Actuators 8, is maintained proportional to the difference between the actual position and the commanded position by means of the electrical feedback to the Variable Exhaust Nozzle Control 3 from the Position Sensor 6 and the mechanical feedback from the V.E.N. Piston Pump 10 to the V.E.N. Servo Valve 14 by the mechanical link 16. When the exhaust nozzle reaches the commanded position, the electrical output signal generated by the Variable Exhaust Nozzle Control 3 is terminated, thereby terminating the hydraulic signal generated by the V.E.N. Servo Valve 14. This terminates the output of the V.E.N. Piston Pump 10 and the V.E.N. Actuators stop with the exhaust nozzle in the commanded position.

Activation of the Emergency Closure Valve 15 blocks the application of control fluid to the V.E.N. Servo Valve 14, and the Emergency Closure Valve 15 generates a hydraulic signal activating the V.E.N. Piston Pump 10 to generate a fluid output retracting the V.E.N. Actuators 8 to close the exhaust nozzle. The termination of the control fluid to the V.E.N. Servo Valve 14 effectively disconnects both the electrical and mechanical feedback loops permitting the exhaust nozzle to close at a maximum rate.

The operation of the thrust reverser system is as follows: In the initial state it is assumed that the Thrust Reversers 4 are in the stowed position, and the Lock Pin Actuator 23 has a mechanical output latching the thrust reversers' locking mechanism, and is blocking the fluid flow on line 22 from actuating the T.R. Actuators 7.

The Thrust Reverser Control 2, in response to a command to deploy the thrust reversers, generates an electrical signal activating the T.R. Servo Valve 19 to produce a first hydraulic signal indicative of the commanded deployment. The T.R. Piston Pump responds to this first hydraulic signal and provides a fluid flow on line 22. Because the fluid flow on line 22 is blocked by the Lock Pin Actuator 23, the pressure on line 22 rises rapidly and when it reaches a predetermined value, the Sequencing Valve 24 is activated to generate a hydraulic signal activating the Lock Pin Actuator 23. The Lock Pin Actuator 23 responds to the hydraulic signal generated by the Sequencing Valve 24 and sequentially generates a mechanical output unlatching the thrust reverser's locking mechanism then opens the previously blocked line 22. The unblocking of line 22 permits the fluid flow in line 22 to actuate the T.R. Actuators 7, thereby deploying the thrust reversers. Simultaneously, the Sequence Valve 24 generates a hydraulic output disabling the Pressure Compensation Valve 20. The system remains in this state with the thrust reversers fully deployed until a command for stowing the thrust reversers is received.

The Thrust Reverser Control 2 in response to a command to stow the thrust reversers, terminates the electrical signal being transmitted to the T.R. Servo Valve 19. The T.R. Servo Valve 19 responds to the termination of the electrical signal and generates a second hydraulic signal which causes the T.R. Piston Pump 9 to supply a fluid flow on 21. The fluid flow in line 21 activates the T.R. Actuators 7 to move the Thrust Reversers 4 towards their stowed position. When the T.R. Actuators reach the end of their travel, indicative of the thrust reversers being in their stowed position the pressure on line 21 rises rapidly. The rapid rise in pressure (pressure surge) on line 21 causes Sequence Valve 24 to change back to its original state. In its original state, the hydraulic signals activating the Lock Pin Actuator 23 and disabling the Pressure Compensator Valve 20 are terminated.

The Lock Pin Actuator 23 in response to the termination of the hydraulic signal from the Sequence Valve 24 sequentially blocks the fluid flow through line 22, then produces a mechanical output latching the thrust reversers locking mechanism. Simultaneously, the Pressure Compensator Valve 20 is activated to modulate the hydraulic signal generated by the T.R. Servo Valve 19 to reduce the output pressure on line 21 to a predetermined intermediate value. The Pressure Compensator Valve 20 and T.R. Piston Pump form a closed loop hydraulic circuit maintaining the pressure on line 21 at the predetermined intermediate value. The thrust reverser will remain in this state until a command to deploy the thrust reverser is received by the Thrust Reverse Control 2.

DETAILS OF THE INTEGRATED HYDRAULIC CONTROL CIRCUIT

Figure 2A:
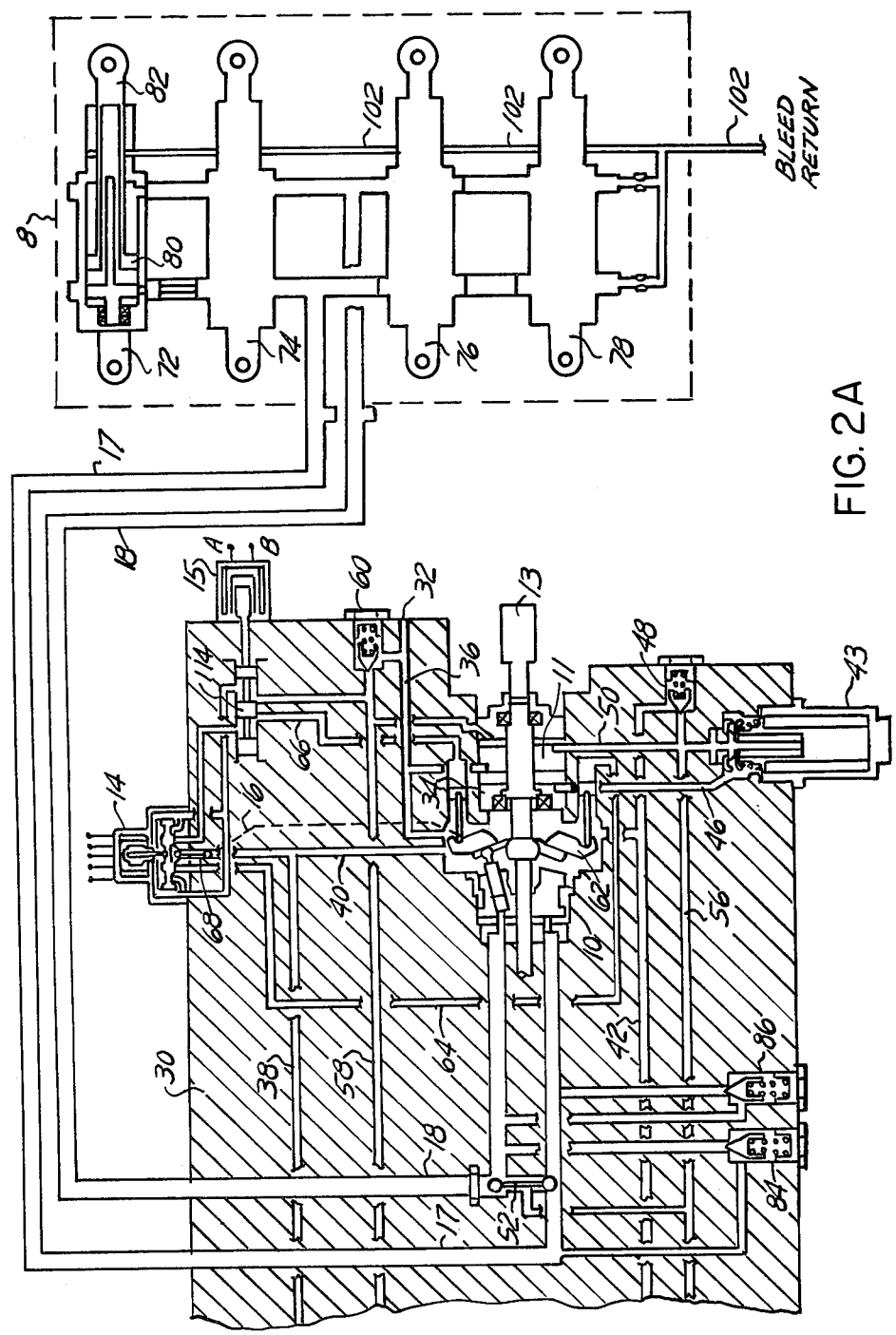
FIGS. 2A and 2B are a hydraulic schematic of the disclosed integrated control circuit with the thrust reverser circuit in the stow state and the variable exhaust nozzle in a stable state.
Figure 2B:
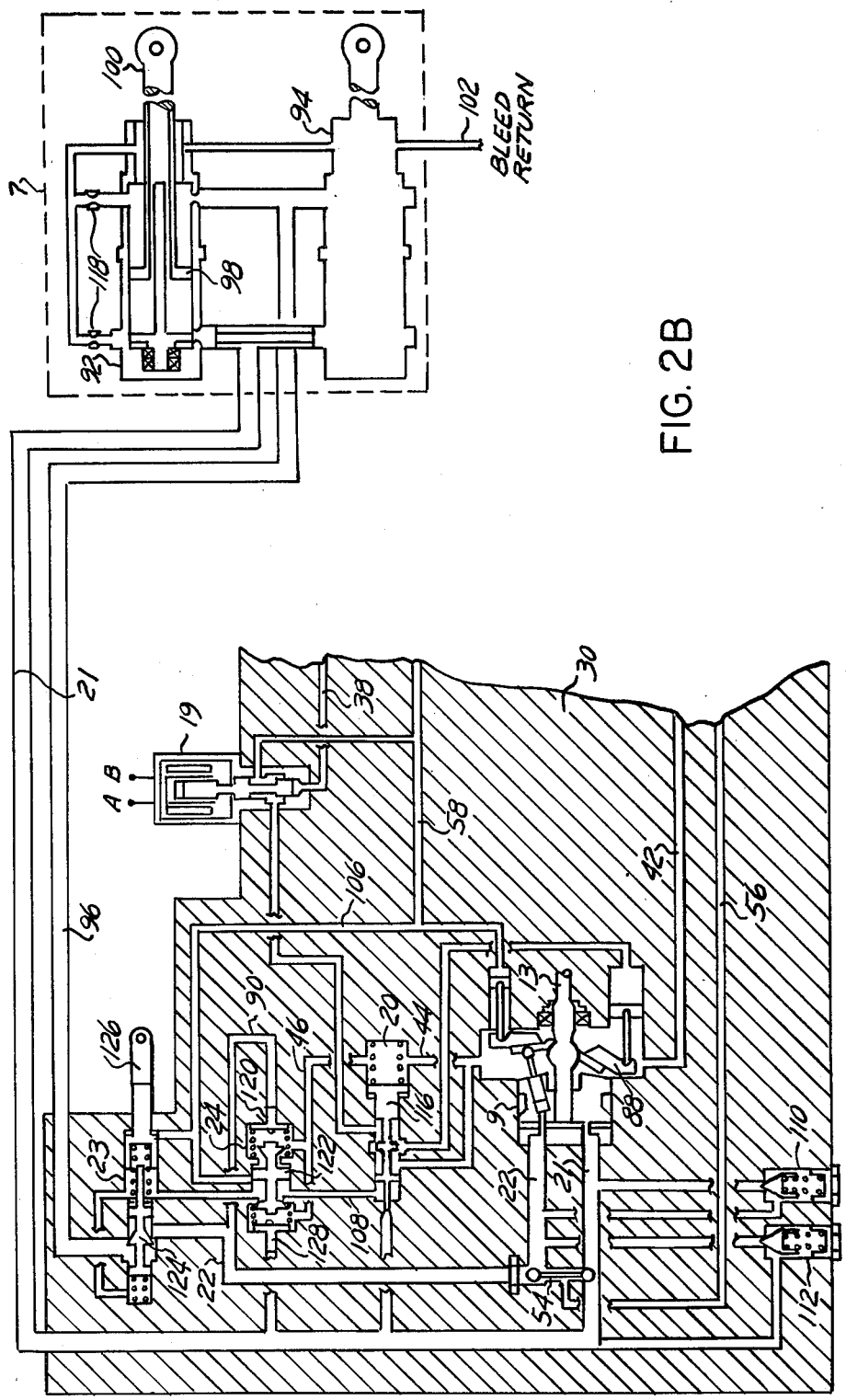

The details of the integrated thrust reverser and variable exhaust nozzle hydraulic control circuits 1 are shown on FIGS. 2A and 2B. Referring to FIGS. 2A and 2B a housing 30 receives a case oil supply at an inlet port 32 from an external source (not shown). The case oil is communicated to a boost pump 34 and the V.E.N. Piston Pump 10 via line 36, to the Thrust Reverser and Variable Exhaust Nozzle Control Valves 19 and 14 via lines 38 and 40 respectively, to the T.R. Piston Pump 9 via line 42, and from the thrust reverser Piston Pump 9 to a Pressure Compensator Valve 20 and a Sequencing Valve 24 via lines 44 and 46 respectively. Line 42 is also connected to a boost relief valve 48.

The output of the boost pump 34 connected to the input of a main filter 43 by means of a line 46. The output of the main filter 43 is connected to the servo pump 11 by means of line 50 and to the boost relief valve 48 and a pair of shuttle valves 52 and 54 by means of line 56.

The output of the Servo Pump 11 is connected to a distributor line 58. The distributor line 58 is connected to a relief valve 60 and to the V.E.N. Servo Valve 14 through the solenoid actuated Emergency Nozzle Closure Valve 15. The distributor line 58 is also connected to the T.R. Servo Valve 19, the Sequencing Valve 24, the Lock Pin Actuator 23 and to one tilt control piston of the Thrust Reverser Piston Pump 9.

The V.E.N. Piston Pump 10 is an overcenter multiple piston pump of a known design, such as disclosed in U.S. Pat. No. 3,367,109. The pump has a tilt block 62 which is tilted in response to input signals received from the V.E.N. Servo Valve 14 over signal lines 64 and 66. A pair of tilt angle pistons tilt the tilt block in response to the pressure differential between the input signals on lines 64 and 66. There are three (3) feedback loops controlling the Piston Pump 10. The first is a first cantilever spring 68 engaged by the second stage spool of the Servo Valve 14 which tends to urge the first stage flapper to subtract from the input displacement. The second feedback loop is a mechanical loop provided by a mechanical link, (a second cantilever spring indicated by the dashed line) 16 which interconnects the tilt block 62 with the servo valve's cantilever spring 68. This second feedback loop maintains the tilt angle of the tilt block 62 proportional to the magnitude of the received electrical signal thereby controlling the gain of the Piston Pump 10 as disclosed in U.S. Pat. No. 3,367,109.

The third feedback loop is an electrical loop generating an electrical signal having a polarity indicative of the direction the exhaust nozzle is to be moved and a value indicative of the difference between the actual and commanded positions of the exhaust nozzle as described with reference to FIG. 1. This third feedback loop is of conventional design known in the art which terminates the electrical signal received by the servo valve when the variable exhaust nozzle reaches its commanded position.

The overcenter Piston Pump 10 produces two output signals on output lines 17 and 18 proportional to the tilt angle of the tilt block 62 as is known in the art. When the tilt block 62 is rotated in a counter-clockwise direction from the neutral position of FIG. 2A, the pressure on output line 18 is higher than the pressure on output line 17. When the tilt block 62 is tilted clockwise from the neutral position, the pressure on output line 17 is higher than the pressure on the output line 18.

The boost pump 34, the Servo Pump 11, Piston Pump 9 and Piston Pump 10 are connected to a common input shaft 13 rotatably driven by an external power source as previously described. The external power source may be an electric motor or the rotary power may be derived from the gas turbine engine itself in a known manner.

The two output lines 17 and 18 of the overcenter Piston Pump 10 are connected in parallel to variable exhaust nozzle or V.E.N. Actuators 8 illustrated as four (4) hydraulic actuators 72 through 78. As detailed in variable exhaust nozzle actuator 72, the two output lines 17 and 18 are connected to the actuators on opposite sides of a piston 80 attached to an actuator arm 82. When the tilt block 62 of the Piston Pump 10 is tilted counter-clockwise from the neutral position shown, the fluid flow through output line 18 urges the piston 80 and its connected actuator arm 82 to the left or to its retracted position. Alternately, when the tilt block 62 is tilted in a clockwise direction, the higher pressure on output line 17 urges piston 80 to the right extending actuator arm 82.

The shuttle valve 52 interconnects the two output lines 17 and 18 of the Piston Pump 10 and applies boost pump pressure to both output lines when the tilt block 62 is in the neutral or null position or to the output line having the lower pressure when the tilt block is tilted in either direction from its neutral position. Pressure relief valves 84 and 86 are connected to the output lines 17 and 18 and limit the maximum pressure that may be applied to these lines by the piston pump 10.

The thrust reverser or TR Piston Pump 9 is similar to the variable exhaust nozzle Piston Pump 10. Piston Pump 9 is modified so that the tilt control piston producing the clockwise rotation of the tilt block 88 has a larger cross sectional area than the tilt control piston producing the counter-clockwise rotation. The smaller tilt control piston of the Piston Pump 9, producing the counter-clockwise rotation of the tilt block 88, receives control fluid directly from servo pump 11 through distributor line 58. The larger tilt control piston tilting the tilt block 88 in a clockwise direction receives fluid from the T.R. Servo Valve 19 through Pressure Compensating Valve 20. The T.R. Piston Pump 9 produces complementary fluid signals on output lines 21 and 22 proportional to the tilt angle of tilt block 88.

In the activated state of T.R. Servo Valve 19, the Pressure Compensating Valve 20 outputs fluid at case pressure to the larger tilt control piston of piston pump 9. The pressure differential between the case pressure and the servo pressure on distributor line 58 is greater than the difference in the cross-sectional areas of the two tilt control pistons which causes the tilt block 88 to be tilted to its maximum counter-clockwise position producing a fluid flow through output line 22 at an increased pressure.

Shuttle valve 54 responds to the increased pressure on output line 22 and applies boost pump pressure to line 21 by means of line 56. Output line 22 is connected directly to the Lock Pin Actuator 23 and to one end of the Sequencing Valve 24 via connecting line 90. Output line 21 is connected to one end of the Pressure Compensating Valve 20, to the opposite end of Sequencing Valve 24 and to the T.R. Actuators 7 illustrated as a pair of hydraulic actuators 92 and 94. The other inputs to the thrust reverser actuators 92 and 94 are connected via line 96 to the output line 22 through Lock Pin Actuator 23.

As illustrated in Thrust Reverser Actuator 92, the thrust reversers each have a piston 98 connected to an actuator arm 100. Bleeds from the thrust reverser actuators 92 and 94 are connected to a bleed line 102 which return the bleed fluid back to the external fluid source.

Control fluid in connector line 58 is also applied to the Lock Pin Actuator 23 via line 106 and to the Pressure Compensating Valve 20 through the Sequencing Valve 24 via line 108. The output lines of Thrust Reverser Piston Pump 9 are connected to relief valves 110 and 112 to limit the maximum pressures on output lines 21 and 22 respectively.

The operation of the thrust reverser hydraulic circuit and the variable exhaust nozzle hydraulic circuit will be discussed independently.

OPERATION OF THE VARIABLE EXHAUST NOZZLE CIRCUIT

The operation of the variable exhaust nozzle hydraulic circuit will be discussed with reference to FIG. 2A. Referring to FIG. 2A, the variable exhaust nozzle circuit is shown in its stable state with the actuators 72 through 78 in their commanded position. The pressure of the signals on input lines 64 and 66 from the V.E.N. Servo Valve 14 are equal and the tilt block 62 is in its neutral position. In this state, the pressure on output lines 17 and 18 are equal and shuttle valve 52 assumes a neutral position and boost pressure is applied to output lines 17 and 18 and to both sides of the pistons 80 in each of the hydraulic actuators 72 through 78. The boost pressure applied to both sides of the piston effectively locks the actuators in their present position. The system remains in this state until an electrical signal indicative of a new position is received by the V.E.N. Servo Valve 14.

The V.E.N. Servo Valve 14 in response to an input electrical signal indicative of a command to extend the hydraulic actuators to a new position produces a forward fluid flow in input signal line 64 and a reverse fluid flow in input signal line 66 which causes the tilt block 62 to tilt in a clockwise direction. The mechanical link 16 causes the differential fluid flows through lines 64 and 66 to be terminated when the tilt block 62 has been rotated to a tilt angle proportional to the magnitude of the received electrical signal. In this state the pressure on output line 17 increases above the boost pressure and the shuttle valve 52 moves upward blocking the passage way between output line 17 and boost pressure line 56. The full fluid flow in output line 17 is now applied to the left side of the pistons 80 urging them and their associated actuator arms 82 to the right. The pistons continue to move to the right until they reach the commanded position. At the commanded position, the received electrical signal is terminated. The feedback via mechanical link 16 will now cause the fluid flows on input lines 64 and 66 to reverse and return the tilt block 62 to its neutral position and the fluid flows through input lines 64 and 66 will become equal. The system thus returns to its stable state as shown on FIG. 2A with the actuator arms 82 in the new commanded position.

The V.E.N. Servo Valve 14 responds to the electrical signal demanding the actuator arms 82 of the actuators to be retracted to a new position by increasing the fluid flow through input signal line 66 and decreasing the fluid flow through input signal line 64 which causes the tilt block 62 to tilt in a counter-clockwise direction until its tilt angle is proportional to the magnitude of the received electrical signal as previously described. In this state, the pressure on output line 18 is increased above the boost pressure and shuttle valve 52 move downward blocking the passage between output line 18 and boost pressure line 56. The increased fluid flow in output line 18 is applied to the right side of the actuator pistons 80 urging them and their associated actuator arms 82 to the left. The actuator arms will continue to move to the left until the new commanded position is reached. At this point the electrical signal to Servo Valve 14 is terminated. The system again will return to its stable state with tilt block 62 in its neutral position and the actuator arms 82 in the new commanded position.

In the event of an emergency, the Emergency Variable Exhaust Nozzle Solenoid Valve 15 is actuated by an electrical signal applied to input terminals designated A and B. In the activated state, the solenoid will move the spool 114 to the right blocking control fluid from being applied to the Servo Valve 14 thereby deactivating Servo Valve 14, and applying control fluid directly to signal line 66. When Servo Valve 14 is deactivated, the pressure on signal line 64 drops to case pressure. The tilt block is now tilted to its full counter-clockwise position which produces a maximum fluid flow through line 18. This causes the actuator arms 82 to be retracted at the maximum rate to their fully retracted position.

OPERATION OF THE THRUST REVERSER CIRCUIT

The operation of the thrust reverser circuit will be described with reference to FIGS. 2B, and 3. Referring first to FIG. 2B which shows the thrust reverser circuit in the stowed position. In this state, there is no electrical signal applied to the T.R. Servo Valve 19 and control fluid is supplied to the smaller of the two tilt control pistons of Piston Pump 9 via distributor line 58. At the same time the spool 116 of the Pressure Compensating Valve 20 is urged to the left by a spring allowing control fluid to be supplied to the larger of the two tilt control pistons in Piston Pump 9. Because of the difference in the surface areas of the two pistons, the tilt block 88 will be urged to tilt in a clockwise direction activating Piston Pump 9 to supply fluid on output line 21 urging pistons 98 and their associated actuator arms 100 to their extreme right or extended positions. The pressure on output line 21 is also applied to one end of a piston extending from spool 116 of the Pressure Compensating Valve 20. When the hydraulic actuators 92 and 94 reach the end of their motion the pressure on line 21 increases producing a force on the end of spool 116 counter to the force of the spring. When the force produced by the pressure on line 21 exceeds a predetermined value, the spool 116 is urged to the right causing some of the control fluid to be bled to case pressure. This reduces the pressure applied to the large tilt control piston, and causes the tilt block 88 to tilt in a counter-clockwise direction reducing the pressure on line 21. The tilt block 88 is thereby tilted until an equilibrium condition is reached. By this action the fluid pressure at the output of the Piston Pump 9 on line 21 is reduced to a lower or compensated pressure. This compensated pressure holds the Thrust Reverse Actuators 7 in the extended or stowed positions and minimizes the heat generated. Fixed orifices 118 permits a sufficient bleed fluid flow to cool the actuators 92 and 94 in this state.

Referring now to FIG. 3, the sequence of operation in deploying the Thrust Reverser Actuators 7 are discussed. The thrust reverser circuit is actuated by energizing the T.R. Servo Valve 19 with an electrical signal applied to its electrical inputs designated A and B. When energized, the Servo Valve 19 cuts off the control fluid applied to the Pressure Compensating Valve 20 and fluid at case pressure is applied to the larger tilt control piston in the Piston Pump 9 through the Pressure Compensating Valve 20. The smaller tilt control piston still receiving control fluid tilts the tilt block 88 in a counter-clockwise direction thereby providing a fluid flow with increased pressure in output line 22. Shuttle Valve 54 responds to the increased pressure on output line 22 and the pressure on output line 21 is reduced to the value of the boost pressure on line 56. The increased pressure on line 22 is applied to a piston 120 in Sequencing Valve 24 via connecting line 90. Because the fluid flow through line 22 is blocked by the Lock Pin Actuator 23, the pressure on line 22 rises rapidly. When the pressure reaches a predetermined value, the piston 120 moves spool 122 to the left as shown. With the spool 122 displaced to the left, the control fluid received via line 106 is blocked and case pressure is applied to both ends of a spool 124 and one end of the lock pin 126 of the Lock Pin Actuator 23. Control fluid being supplied directly to the opposite side of the lock pin 126 now urges the lock pin 126 to the left against the force of a resilient spring. After the lock pin 126 has moved a predetermined distance, the lock pin 126 engages spool 124. This initial movement of the lock pin 126 produces the mechanical motion unlatching the thrust reverser as previously described. Continued movement of the lock pin 126 to the left after engaging spool 124 moves spool 124 to the left as shown. In this position of spool 124, the fluid path through the lock pin actuator is opened and the fluid flow through output line 22 is transmitted to the actuators 92 and 94 through interconnecting line 96. The fluid flow through interconnecting line 96 is applied to the right side of pistons 98 urging them and actuator arms 100 to the left closing the thrust reversers.

When spool 122 in the Sequencing Valve 24 is moved to the left by piston 120, case pressure is also applied to the left end of the spool 116 disabling the Pressure Compensating Valve 20 and the spool 116 is moved to its extreme left position by the force of the spring acting on its opposite end. In this position, case pressure from the T.R. Servo Valve 19 is applied directly to the larger tilt control piston causing the tilt block 88 to be tilted fully counter-clockwise. This causes the full discharge pressure to be placed on line 22 from the Piston Pump 9. The circuit remains in this condition as long as the Servo Valve 19 is energized. Excess fluid flow is relieved via relief valve 112.

The operational sequence of stowing the thrust reverser buckets is as follows: Deenergizing the T.R. Servo Valve 19 supplies control fluid to the Pressure Compensating Valve 20 as illustrated in FIG. 2B. With the spool 116 of the Pressure Compensating Valve 20 displaced to its extreme left position as shown in FIG. 3, control fluid is supplied to the larger tilt control piston of the Piston Pump 9 causing the tilt block 88 to tilt in a clockwise direction to its full clockwise position. The fluid flow through output line 22 is terminated and the fluid flow through output line 21 increases. The state of the Sequencing Valve 24 remains unchanged. The increasing fluid flow through line 21 urges pistons 98 to the right extending actuator arms 100 and retracting the Thrust Reversers 4. When the pistons 98 reach the end of their travel, there is a sudden pressure rise on output line 21 which produces a sufficient force on piston 128 of the Sequencing Valve 24 to overcome the force of the spring and move spool 122 to the right returning it to the position shown in FIG. 2B. In this state, control fluid is again supplied to the Pressure Compensating Valve 20 and the Lock Pin Actuator 23. Control fluid applied to the left end of spool 116 enables Pressure Compensator Valve 20, to once more respond to the pressure on line 21 and reduce the pressure applied to the larger tilt control piston of Piston Pump 9. As previously described, the Pressure Compensating Valve 20 and the Piston Pump 9 form a closed loop hydraulic circuit in which the output pressure of the Piston Pump is controlled to generate a compensated pressure of reduced valve.

The application of control fluid to the left sides of spool 124 and lock pin 126 of the Lock Pin Actuator 23 first causes the spool 124 and lock pin 126 to be urged to the right blocking the fluid path between output line 22 and the actuators 92 and 94. The lock pin 126 thereafter continues to move by itself to the right producing the mechanical motion latching the thrust reversers locking mechanism. This returns the Thrust Reversers 7 to their original state as shown on FIG. 2B with the thrust reversers locked in the stowed position.

ALTERNATE EMBODIMENT OF THE LOCK PIN ACTUATOR

Figure 4:
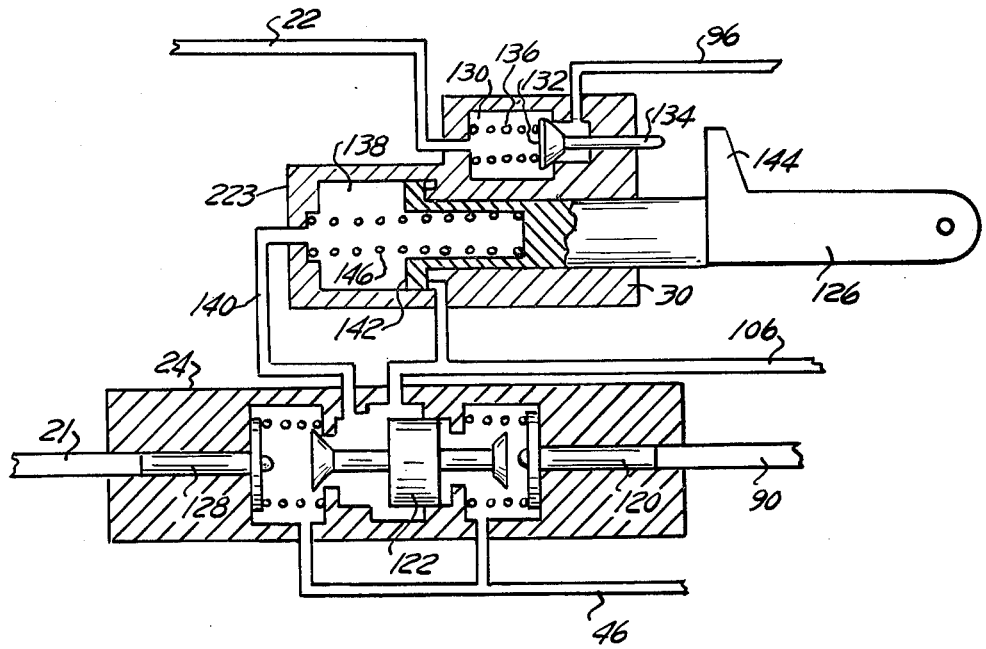
FIG. 4 is a partial schematic showing the sequencing valve and an alternate embodiment of the lock pin actuator in the stowed state.
Figure 5:
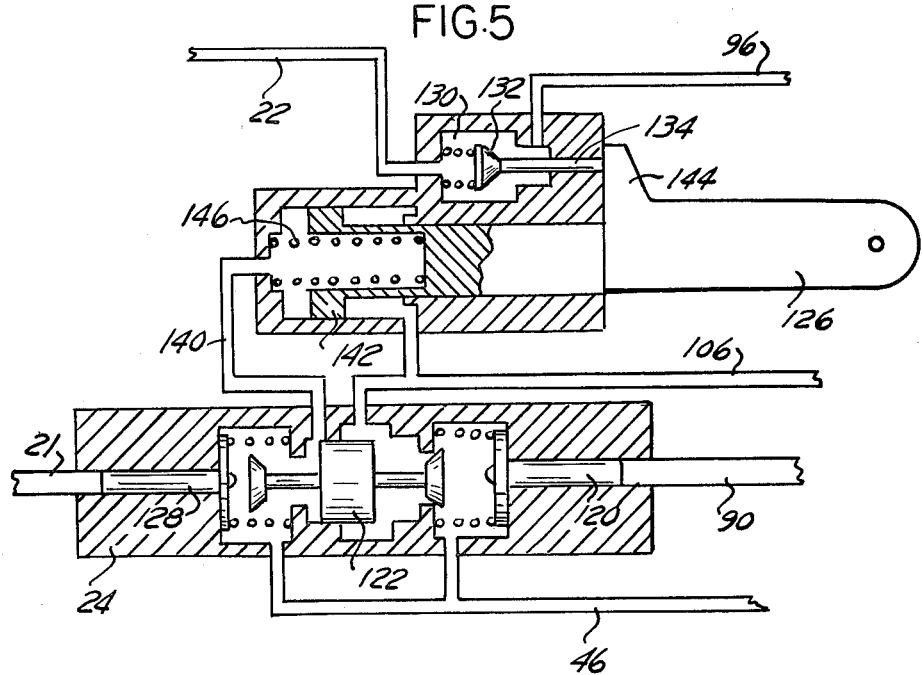
FIG. 5 is the partial schematic of FIG. 4 showing the position of the elements in the deployed state.

An alternate version of the lock pin actuator 23 is illustrated in FIGS. 4 and 5. FIG. 4 shows the position of the elements in the alternate embodiment of the Lock Pin Actuator 223 and in the Sequencing Valve 24 in the stowed state while FIG. 5 shows these same elements in the deployed state. The Sequencing Valve 24 and remainder of the thrust reverser circuit are as previously described with reference to FIGS. 2 and 3. The alternate embodiment of the Lock Pin Actuator 223 has a first chamber 130 connected to the output line 22 at one end and connected to actuators 92 and 94 at the opposite end through line 96. At the opposite end is a check valve 132 having an axial pin 134 which protrudes beyond the housing 30 in the stowed state as shown. The check valve 132 is held in the closed position by a spring 136. The Lock Pin Actuator 223 also has a second chamber 138 connected to line 140 from the Sequencing Valve 24 at one end and to distributor line 106 at the other end. The Lock Pin 126 has a lock pin spool 142 disposed in the second chamber 138 intermediate the lines 140 and 106, and a lug 144. A spring 146 urges the lock pin 126 towards the extended position as shown in FIG. 4.

The operation of the Lock Pin Actuator 223 is as follows: In the stowed state, spool 122 of the Sequencing Valve 24 is displaced to the right as shown in FIG. 4 and the control fluid on line 106 is applied to both sides of the lock pin spool 142. The surface area on the left side of spool 142 being larger than the surface area on the right side causes the lock pin 126 to be urged to the right or its extended position. The force of spring 146 assists in moving the lock pin 126 to its extended position. The check valve 132 is held in its closed position by spring 136 blocking the fluid flow through output line 22 from being applied to the actuators 92 and 94 via line 96.

To deploy the thrust reversers, the Thrust Reverser Servo Valve 19 is energized which causes the pressure on output line 22 to increase as previously described. This increased pressure on output line 22 activates piston 120 of the Sequencing Valve 24 via connecting line 90 to move the spool 122 to the left as shown on FIG. 5. In this state, the Sequencing Valve 24 blocks the application of control fluid to the left side of spool 142 in the Lock Pin Actuator 223. The control fluid applied to the right side of spool 142 now urges the lock pin 126 toward the left or retracted position against the force of spring 146. After the lock pin 126 has been retracted a distance sufficient to unlatch the thrust reversers, lug 144 engages pin 134. Continued movement of the lock pin 126 to the left opens check valve 132 permitting the pressure on output line 22 to be applied to the actuators 92 and 94 by means of line 96. This causes the pistons 98 in the actuators to move to the left retracting actuator arms 98 and deploying the thrust reversers. The Lock Pin Actuator 223 and Sequencing Valve 24 remain in the state shown in FIG. 5 as long as the Thrust Reverser Servo Valve 19 is energized.

The circuit is energized to stow the thrust reverser buckets by deenergizing the Servo Valve 19. As previously described, deenergizing Servo Valve 19 reapplies control fluid to the Pressure Compensating Valve 20 which causes the Piston Pump 9 to output a fluid flow on line 21. The fluid flow causes the pressure on line 21 to move the actuator arms 100 to their extended position retracting the thrust reversers. When the actuator arms 100 reach the end of their travel placing the thrust reversers in their stowed position, a pressure pulse or surge is generated on output line 21 which urges piston 128 to the right pushing spool 122 back to the position shown in FIG. 4. In this state, the Sequencing Valve 24 again applies control fluid to the left side of the lock pin spool 142. The lock pin 126 is now urged toward the right or its extended position. The initial movement of the lock pin 126 towards the right permits spring 136 to close check valve 132. After check valve 132 is closed, the lock pin 126 continues to move to the right to its fully extended position locking the thrust reversers in their stowed position. The Lock Pin Actuator 223 and Sequencing Valve 24 remain in the state until the servo control valve is again energized.

Both Lock Pin Actuators 23 and 223 follow the same sequence of operation in deploying and stowing the thrust reversers 7. It is understood that persons skilled in the art may make changes in the preferred embodiment of the disclosed system without departing from the scope and spirit of the invention as set forth in the appended claims.

We claim:

1. An integrated hydraulic system for controlling the positions of the thrust reversers and variable exhaust nozzle of a gas turbine engine, wherein said thrust reversers include a locking mechanism locking the thrust reversers in a stowed position, said system characterized by:

a housing defining a chamber containing case fluid at a case pressure;

a shaft disposed in said housing adapted to be rotatably driven by an external power source;

fluid pump means driven by said shaft for increasing the pressure of the case fluid to supply control fluid at a servo pressure;

first signal generator means for generating first electrical signals indicative of a commanded position of the exhaust nozzle said first electrical signals having a magnitude indicative of the distance between the present position and the commanded position and a polarity indicative of the desired direction of motion;

first servo valve means for modulating said control fluid to generate hydraulic nozzle directional control signals in response to said first electrical signals;

first piston pump means driven by said shaft for supplying nozzle actuator fluid in response to said nozzle directional control signals;

exhaust nozzle actuator means for moving the engine's exhaust nozzle towards said commanded position in response to said nozzle actuator fluid;

feedback means responsive to the position of the engine's exhaust nozzle for terminating said first electrical signals when the exhaust nozzle is in the commanded position;

second signal generator means for generating second electrical signals indicative of a commands to deploy and stow said thrust reversers;

second servo valve means for modulating, said control fluid to generate hydraulic thrust reverser position signals in response to said second electrical signals;

second piston pump means for alternatively supplying deploy fluid and stow fluid in response to said hydraulic position signals;

sequencing valve means for modulating said control fluid in response to said second piston pump supplying said deploy and stow fluids to generate hydraulic lock and unlock signals, said sequencing valve having a first state generating said unlock signal in response to the pressure of said deploy fluid exceeding a first predetermined pressure and a second state generating said lock signal in response to the pressure of said stow fluid exceeding a second predetermined value;

lock pin actuator means responsive to said control fluid, and said lock and unlock signals for actuating the thrust reverser's locking mechanism and controlling the transmission of said deploy actuator fluid, said lock pin actuator means having a first state sequentially blocking the flow of said deploy actuator fluid then deploying a lock pin activating the thrust reversers locking mechanism in response to said lock signal, a second state sequentially retracting the lock pin deactivating the thrust reverser locking mechanism then enabling the flow of said deploy actuator fluid in response to said unlock signal;

thrust reverser actuator means for stowing the thrust reversers in response to receiving said stow actuator fluid from said second piston pump means and for deploying said thrust reversers in response to receiving said deploy actuator fluid from said lock pin actuator means.

2. The system of claim 1 wherein said fluid pump means comprises:

a boost pump driven by said shaft for increasing the pressure of said case fluid to supply boost fluid at a boost pressure, and a servo pump driven by said shaft for increasing the pressure of the boost fluid to supply said control fluid.

3. The system of claim 2 wherein said first piston pump means comprises:

a first multiple piston overcenter pump for alternatively supplying a first nozzle actuator fluid at a first output and a second nozzle actuator fluid at a second output in response to said hydraulic nozzle directional control signals; and first shuttle valve means for conducting boost fluid to said first and second outputs to maintain the minimum pressure at first and second outputs equal to said boost pressure.

4. The system of claim 3 wherein said multiple piston overcenter pump has a tilt block tilted in response to said nozzle directional control signals and wherein the tilt angle of said tilt block is determinative of the rate at which said first and second nozzle actuator fluid is supplied, said system further includes a mechanical feedback link connected between said tilt block and said first servo valve means for terminating said hydraulic nozzle directional control signal when the tilt angle of said tilt block corresponds to the magnitude of said first electrical signal.

5. The system of claim 1 or 4 further including a solenoid activated emergency nozzle closure valve disposed between said servo pump and said first servo valve means and between said first servo valve means and said first piston pump means, said emergency nozzle closure valve having an unactivated state passing said control fluid to said first servo valve means and said nozzle directional control signal from said first servo valve means to said first piston pump means, and having an activated state blocking the flow of said control fluid to said first servo valve means and supplying said control fluid directly to said first piston pump means thereby generating a nozzle directional control signal activating said first piston pump means to supply nozzle actuator fluid causing said nozzle actuator means to retract and close the exhaust nozzle.

6. The system of claim 1 wherein said second piston pump means comprises:

a second multiple piston overcenter pump for alternatively supplying said stow fluid at a first output and said deploy fluid as a second output, said overcenter pump having a tilt block tilted in response to said thrust reverser position signals, the tilt angle of said tilt block being determinative of whether said overcenter pump supplies said stow fluid or said deploy fluid and the rate at which said stow and deploy fluid is supplied;

second shuttle valve means for conducting boost fluid to the first and second outputs of said second overcenter pump to maintain the minimum pressure at said first and second outputs equal to said boost pressure.

7. The system of claim 6 wherein said position signals generated by said second servo valve means are a control fluid flow indicative of a command to stow the thrust reversers and a case fluid flow indicative of a demand to deploy said thrust reversers, said overcenter pump has a first and second tilt control piston controlling the tilt angle of said tilt block, said first tilt control piston having a smaller cross sectional area than said second tilt control piston, said first tilt control piston receiving said control fluid directly from said servo pump, and said second tilt control piston receiving said position signals.

8. The system of claim 7 wherein said system further includes a pressure compensating valve for modulating the flow of said control fluid applied to said second tilt control piston in response to the pressure of said stow fluid to limit the pressure of the stow fluid to a predetermined value.

9. The system of claim 8 wherein said pressure compensation valve is further responsive to the lock and unlock signals generated by said sequencing valve, said lock signal enabling said pressure compensation valve to limit the pressure being supplied by said second overcenter pump means to said predetermined value and said unlock signal disabling said pressure compensating valve.

10. The system of claim 9 wherein said pressure compensator valve comprises:
 a cylindrical chamber having a first section having a first diameter, a second section having a smaller diameter, and a piston aperture at the end of said second section, said piston aperture connected to the second output of said second overcenter pump, and the junction between said first and second sections forming a stop shoulder;
 a spool slidably disposed in said chamber, said spool having a piston axially extending from one end of said spool and received in said piston aperture, a radial flange disposed at the opposite end of said spool, a first land disposed at said one end of the spool, a second land disposed at the opposite end of said spool contiguous with said radial flange, and an intermediate land axially disposed between said first and second lands;
 resilient means disposed in said first section between the end of said chamber and said spool for urging said radial flange to engage said stop shoulder;
 a first port for connecting the output of said second servo valve to said second section at a location intermediate to said second and intermediate lands;
 a second port connecting the second tilt control piston of said second overcenter pump to said second section at a location between said second and intermediate lands and adjacent to said intermediate land;
 a third port connecting the supply of case fluid to said second section at a location intermediate said first and intermediate lands; and
 a fourth port connecting the output of said sequencing valve to said second section at a location intermediate the first land and the end of said chamber.

11. The system of claim 9 wherein said servo valve comprises:
 a cylindrical chamber having a first and second valve seats effectively dividing said chamber into first, second, and third sections;
 a spool slidably disposed in said chamber, said spool having a valve at each end, one of said valves disposed in said first section and the other disposed in said third section, said valves alternatively engaging said first and second valve seats as said spool is axially disposed in either direction, said spool further having a land axially disposed between said two valves;
 first resiliently mounted piston means, disposed in the end of said first section and connected to the second output of said second overcenter pump, for displacing said spool to a first position with one of said valves engaging the valve seat separating said first and second sections when the pressure of said stow fluid exceeds a predetermined value;
 second resiliently mounted piston means, disposed in the end of said third section and connected to the first output of said second overcenter pump, for displacing said spool to a second position with the other of said valve engaging the valve seat separating said second and third sections when the pressure of said deploy fluid exceeds a predetermined value;
 first and second port means respectively interconnecting said first and third chambers with said supply of case fluid;
 third port means receiving said control fluid at a location in said second section intermediate said first and second valve seats, said third port means blocked by said spool land when said spool is displaced to said second position;
 output port means interconnecting said lock pin actuator means and sequencing valve means with said second section at a location adjacent to the valve seat separating said first and second section.

12. The system of claim 9 wherein said lock pin actuator means comprises:
 a cylindrical chamber having a first section and a second section divided by an inwardly directed radial shoulder, said radial shoulder forming a fluid aperture interconnecting said first and second sections, said first section having a valve seat disposed intermediate its ends and said second section having a lock pin aperture axially disposed at the end opposite said shoulder;
 a first spool slidably disposed in said first section, said first spool having a first land at one end, a second land at the opposite end, a valve axially disposed between said first and second lands and a pin axially extending from said opposite end into said second section through said fluid aperture;
 first means disposed in said first section for resiliently biasing said first spool towards said second section to engage said valve with said valve seat;
 a second spool slidably disposed in said second section, said second spool having a lock pin at one end axially extending outwardly through said lock pin aperture;
 second means disposed in said second section for resiliently biasing said second spool away from said shoulder;
 first and second port means interconnecting the end of said second section adjacent to said shoulder to the end of said first section opposite said shoulder;

third port means interconnecting the first output of said second overcenter pump with said first section at a location intermediate said valve seat and said shoulder;

a fourth port interconnecting said thrust reverser actuators with said first section at a location intermediate said valve seat and the end opposite said shoulder;

a fifth port interconnecting the output of said sequencing valve with said second chamber at a location adjacent to said shoulder; and a sixth port interconnecting the output of said servo pump with said second chamber at a location adjacent to the end of said second section opposite said shoulder.

13. The system of claim 9 wherein said lock pin actuator means comprises:

a cylindrical valve chamber having a valve pin aperture at one end and a valve seat intermediate its opposite ends;

a valve pin member slidably disposed in said valve chamber, said valve pin member having a valve disposed intermediate said valve seat and the end opposite said one end, and an axial pin passing through said valve pin aperture, said pin having a length sufficient to protrude outwardly a small distance from said housing when said valve is displaced against said valve seat;

first resilient means for biasing said valve pin member in a direction to seat said valve against said valve seat;

first port means for interconnecting the first output of said second overcenter pump with the end of said valve chamber opposite said valve pin aperture;

second port means for interconnecting said thrust reverser actuators with said valve chamber at a location intermediate said valve seat and said one end;

a cylindrical lock pin chamber having a lock pin aperture at one end;

a lock pin spool slidably disposed in said lock pin chamber, said lock pin spool having a lock pin axially extending from one end of said lock pin spool through said lock pin aperture, said lock pin having a lug external to said housing aperture operative to engage said valve pin when said lock pin spool is in a position intermediate the ends of said lock pin chamber;

second resilient means for biasing said lock pin spool in a direction towards the end of said lock pin chamber having said lock pin aperture;

third port means for interconnecting the output of said servo valve means with the end of said lock pin chamber opposite said lock pin aperture; and fourth port means for interconnecting the output of said servo pump means with said one end of said lock pin chamber.

14. An integrated hydraulic circuit for controlling the position of the hydraulic actuators for the thrust reversers a variable exhaust nozzle of a gas turbine engine wherein the thrust reversers include a locking mechanism for locking the thrust reversers in the stowed position, said hydraulic circuit comprising:

a housing defining a chamber containing case fluid at a case pressure;

a shaft disposed in said housing adapted to be rotably driven by an external power source;

servo pump means driven by said shaft for increasing the pressure of said case fluid to supply control fluid at a servo pressure;

first servo valve means for modulating said control fluid to generate hydraulic nozzle directional control signals in response to electrical signals received from an external source;

first piston pump means driven by said shaft for supplying nozzle actuator fluid to the exhaust nozzle actuators in response to said nozzle control signals;

second servo valve means for modulating said control fluid to generate hydraulic thrust reverser position signals in response to electrical signals received from an external source;

second piston pump means for alternatively supplying deploy fluid and stow fluid to the thrust reverser actuators in response to said hydraulic position signals;

sequencing valve means for modulating said control fluid in response to said second piston pump means supplying said deploy and said stow fluids to generate at an output hydraulic lock and unlock signals; said sequencing valve having a first state generating said unlock signal in response to said deploy fluid exceeding a first predetermined value, and a second state generating said lock signal in response to said stow fluid exceeding a second predetermined pressure; and lock pin actuator means for controlling the transmission of said deploy fluid to the thrust reverser actuators and for locking and unlocking the thrust reverser locking mechanism in a predetermined sequence in response to said hydraulic lock and unlock signals.

15. The hydraulic circuit of claim 14 wherein said lock pin actuator means includes a lock pin mechanically linked to the thrust reversers locking mechanism and wherein said lock pin actuator means has a locked state with said lock pin deployed to actuate the thrust reversers locking mechanism and the flow of said deploy fluid to the thrust reversers actuators blocked and an unlocked state with said lock pin retracted to unlock the thrust reversers locking mechanism and the flow of said deploy fluid to the thrust reverser actuators unblocked, said lock pin actuator means in the transition from said locked state to said unlocked state in response to said hydraulic unlock signal sequentially retracting said lock pin the unblocking the flow of said deploy fluid to said thrust reverser actuators and in the transaction from said unlocked state to said locked state in response to said hydraulic lock signal sequentially blocking the flow of said deploy fluid then deploying said lock pin to actuate the thrust reversers locking mechanism.

16. The hydraulic circuit of claim 14 wherein said servo pump means comprises:

a boost pump driven by said shaft for increasing the pressure of said case fluid to supply boost fluid at a boost pressure; and a servo pump driven by said shaft for increasing the pressure of said boost fluid to supply said control fluid.

17. The hydraulic circuit of claim 16 wherein said first piston pump means is a first multiple piston overcenter pump for alternatively supplying a first nozzle actuator fluid at a first output and a second nozzle actuator fluid at a second output in response to said hydraulic nozzle directional control signals.

18. The hydraulic circuit of claim 17 further including a first shuttle valve means for conducting boost fluid to said first and second outputs of said first overcenter pump to maintain the minimum pressure of said first and second outputs equal to said boost pressure.

19. The hydraulic circuit of claim 17 wherein said electrical signals received by said first servo valve means has a polarity indicative of the direction and a magnitude indicative of the distance the exhaust nozzle is to be moved, and wherein said multiple piston overcenter pump has a tilt block tilted in response to said hydraulic nozzle directional control signals and wherein the tilt angle of said tilt block is determinative of the rate at which said first and second nozzle actuator fluid is supplied, said circuit further includes a mechanical feedback link connected between said tilt block and said first servo valve means for terminating said hydraulic nozzle directional control signal when the tilt angle of said tilt block corresponds to the magnitude of said first electrical signal.

20. The hydraulic circuit of claim 14 or 19 further including a solenoid activated emergency nozzle closure valve means disposed between said servo pump means and said first servo valve means and between said first servo valve means and first piston pump means, said emergency nozzle closure valve having an unactivated state passing said servo fluid to said first servo valve and said nozzle directional control signal from said first servo valve to said first piston pump means, and having an activated state blocking the flow of said servo fluid to said first servo valve and directing said servo fluid directly to said first piston pump means thereby generating a nozzle directional control signal activating said first piston pump means to supply nozzle actuator fluid causing the exhaust nozzle actuator means to retract and close the exhaust nozzle.

21. The hydraulic circuit of claim 14 wherein said second piston pump means is a second multiple piston overcenter pump for alternatively supplying said stow fluid at a first output and said deploy fluid as a second output, said overcenter pump having a tilt block tilted in response to said thrust reverser position signals, the tilt angle of said tilt block being determinative of whether said overcenter pump supplies said stow fluid or said deploy fluid.

22. The hydraulic circuit of claim 21 further including a second shuttle valve means for conducting boost fluid to the first and second outputs of said second overcenter pump to maintain the minimum pressure of said first and second outlets equal to said boost pressure.

23. The hydraulic circuit of claim 21 wherein said position signals generated by said second servo valve means are a control fluid signal indicative of a command to stow the thrust reversers and a case fluid signal indicative of a command to deploy the thrust reversers, said second overcenter pump has a first and second tilt control piston controlling the tilt angle of said tilt block, said first tilt control piston having a smaller cross sectional area than said second tilt control piston, said first tilt control piston receives said control fluid directly from said servo pump, and said second tilt control piston receiving said position signals.

24. The hydraulic circuit of claim 23 wherein said circuit further includes a pressure compensating valve means for modulating the flow of said control fluid applied to said second tilt control piston in response to the pressure of said stow fluid to limit the pressure of the stow fluid being supplied by said second overcenter pump to a predetermined value.

25. The hydraulic circuit of claim 24 wherein said pressure compensation valve means is further responsive to the lock and unlock signals generated by said sequencing valve, said lock signal enabling said pressure compensating valve means to limit the pressure being supplied by said second overcenter pump to said predetermined value, and said unlock signal disabling said pressure compensating valve.

26. The hydraulic circuit of claim 25 wherein said pressure compensator valve comprises:
a cylindrical chamber having a first section having a first diameter, a second section having a diameter smaller than said first diameter, and a piston aperture at the end of said second section connected to the second output of said second overcenter pump, the junction between said first and second sections forming a stop shoulder;
a spool slidably disposed in said chamber, said spool having a piston axially extending from one end and received in said piston aperture, a radial flange disposed at the opposite end of said spool, a first land disposed at said one end of the spool, a second land disposed at the opposite end of said spool contigous with said radial flange, and an intermediate land axially disposed between said first and second lands;
resilient means disposed in said first section between the end of said chamber and said spool for urging said radial flange to engage said stop shoulder;
first port means for connecting the output of said second servo valve to said second section at a location intermediate to said second and intermediate lands;
second port means for connecting the second tilt control piston of said second overcenter pump to said second section at a location between said second and intermediate lands and adjacent to said intermediate land;
third port means for connecting the supply of case fluid to said second section at a location intermediate said first and intermediate lands; and
fourth port means for connecting the outport of said sequencing valve to said second section at a location intermediate the first land and the end of said chamber.

27. The hydraulic circuit of claim 25 wherein said servo valve comprises:
a cylindrical chamber having a first and second valve seats effectively dividing said chamber into first, second, and third section;
a spool slidably disposed in said chamber, said spool having a valve at each end, one of said valves disposed in said first section and the other disposed in said third section, said valves alternatively engaging said first and second valve seats as said spool is axially displaced in either direction, said spool further having a land axially disposed between said two valves;
first resiliently mounted piston means, disposed in the end of said first section and connected to the second output of said second overcenter pump, for displacing said spool to a first position with one of said valves engaging the valve seat separating said first and second sections when the pressure of said stow fluid exceeds a predetermined value;

second resiliently mounted piston means, disposed in the end of said third section and connected to the first output of said second overcenter pump, for displacing said spool to a second position with the other of said valves engaging the valve seat separating said second and third sections when the pressure of said deploy fluid exceeds a predetermined value;

first and second port means for prespectively interconnecting said first and third chambers with said supply of case fluid;

third port means for receiving said control fluid at a location in said second section intermediate said first and second valve seats, said third port means blocked by said spool land when said spool is displaced to said second position;

output port means for interconnecting said lock pin actuator means and sequencing valve means with said second section at a location adjacent to the valve seat separating said first and second section.

28. The hydraulic circuit of claim 25 wherein said lock pin actuator means comprises:

a cylindrical chamber having a first section and a second section divided by an inwardly directed radial shoulder, said radial shoulder forming a fluid aperture interconnecting said first and second sections, said first section having a valve seat disposed intermediate its ends and said second section having a lock pin aperture axially disposed at the end opposite said shoulder;

a first spool slidably disposed in said first section, said first spool having a first land at one end, a second land at the opposite end, a valve axially disposed between said first and second lands and a pin axially extending from said opposite end into said second section through said fluid aperture;

first means disposed in said first secion for resiliently biasing said first spool towards said second section to engage said valve with said valve seat; and a second spool slidably disposed in said second section, said second spool having a lock pin at one end axially extending outwardly through said lock pin aperture;

second means disposed in said second section for resiliently biasing said second spool away from said shoulder;

first and second port means interconnecting the end of said second section adjacent to said shoulder to the end of said first section opposite said shoulder;

third port means interconnecting the first output of said second overcenter pump with said first section at a location intermediate said valve seat and said shoulder;

a fourth port interconnecting said thrust reverser actuators with said first section at a location intermediate said valve seat and the end opposite said shoulder;

a fifth port interconnecting the output port means of said sequencing valve with said second chamber at a location adjacent to said shoulder; and a sixth port interconnecting the output of said servo pump with said second chamber at a location adjacent to the end of said second section opposite said shoulder.

29. The hydraulic circuit of claim 25 wherein said lock pin actuator means comprises:

a cylindrical valve chamber having a valve pin aperture at one end and a valve seat intermediate its opposite ends;

a valve pin member slidably disposed in said valve chamber, said valve pin member having a valve disposed intermediate said valve seat and the end opposite said one end, and an axial pin passing through said valve pin aperture, said pin having a length sufficient to protrude outwardly a small distance from said housing when said valve is displaced against said valve seat;

first resilient means for biasing said valve pin member in a direction to seat said valve against said valve seat;

first port means for interconnecting the first output of said second overcenter pump with the end of said valve chamber opposite said valve pin aperture;

second port means for interconnecting the thrust reverser actuators with said valve chamber at a location intermediate said valve seat and said one end;

a cylindrical lock pin chamber having a lock pin aperture at one end;

a lock pin spool slidably disposed in said lock pin chamber, said lock pin spool having a lock pin axially extending from one end of said lock pin spool through said lock pin aperture, said lock pin having a lug external to said housing operative to engage said valve pin when said lock pin spool is in a position intermediate the ends of said lock pin chamber;

second resilient means for biasing said lock pin spool in a direction towards the end of said lock pin chamber having said lock pin aperture;

third port means for interconnecting the output port means of servo valve means with the end of said lock pin chamber opposite said lock pin aperture; and fourth port means for interconnecting the output of said servo pump means with said one end of said lock pin chamber.

* * * * *